(12) United States Patent
Kaippallimalil

(10) Patent No.: US 8,335,490 B2
(45) Date of Patent: Dec. 18, 2012

(54) ROAMING WI-FI ACCESS IN FIXED NETWORK ARCHITECTURES

(75) Inventor: John Kaippallimalil, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 764 days.

(21) Appl. No.: 12/192,488

(22) Filed: Aug. 15, 2008

(65) Prior Publication Data

US 2009/0054037 A1 Feb. 26, 2009

Related U.S. Application Data

(60) Provisional application No. 60/957,740, filed on Aug. 24, 2007.

(51) Int. Cl.
*H04M 1/66* (2006.01)
*G06F 15/16* (2006.01)
*H04L 9/08* (2006.01)

(52) U.S. Cl. ............ 455/411; 380/278; 709/229

(58) Field of Classification Search .......... 455/411
See application file for complete search history.

(56) References Cited

U.S. PATENT DOCUMENTS

| 6,728,536 | B1 | 4/2004 | Basilier et al. | |
|---|---|---|---|---|
| 2004/0250136 | A1* | 12/2004 | Albertine Trappeniers et al. | 713/201 |
| 2005/0102410 | A1* | 5/2005 | Tuomi | 709/229 |
| 2005/0163320 | A1* | 7/2005 | Brown et al. | 380/270 |
| 2006/0140150 | A1 | 6/2006 | Olvera-Hernandez et al. | |
| 2007/0016780 | A1* | 1/2007 | Lee et al. | 713/171 |
| 2007/0112967 | A1 | 5/2007 | Lee et al. | |
| 2007/0155384 | A1 | 7/2007 | Haran et al. | |
| 2007/0208874 | A1* | 9/2007 | Previdi et al. | 709/238 |
| 2008/0051060 | A1* | 2/2008 | Lee et al. | 455/411 |

FOREIGN PATENT DOCUMENTS

| CN | 1476698 A | 2/2004 |
|---|---|---|
| EP | 1365621 A1 | 11/2003 |

OTHER PUBLICATIONS

Foreign Communication From a Related Counterpart Application—International Search Report and Written Opinion, PCT/CN2008/072126, Nov. 20, 2008, 13 pages.

(Continued)

*Primary Examiner* — Lester Kincaid
*Assistant Examiner* — Andy Gu
(74) *Attorney, Agent, or Firm* — Conley Rose, P.C.; Grant Rodolph; Brandt Howell

(57) ABSTRACT

An apparatus comprising a node comprising an access controller (AC) and an authentication, authorization and accounting (AAA) proxy (AAA-P), wherein the AC is configured to manage authentication for a user equipment (UE), and wherein the AAA-P is configured to exchange authentication information related to the UE with an AAA server. Included is a network component comprising at least one processor configured to implement a method comprising establishing a first tunnel with a home gateway (HG), wherein the HG communicates wirelessly with a UE, and establishing a second tunnel between the UE and a Network Access Server (NAS). Also included is a network component comprising at least one processor configured to implement a method comprising receiving a Pairwise Master Key (PMK) from an AAA mediator (AAA-M), and authenticating a UE using the PMK.

23 Claims, 4 Drawing Sheets

OTHER PUBLICATIONS

ITU-T, "Series G: Transmission Systems and Media, Digital Systems and Networks, Digital Sections and Digital Line System—Optical Line Systems for Local and Access Networks, ONT Management and Control Interface Specifications for B-PON System with Protection Features," Telecommunication Standardization Sector of ITU, G.983.6, Jun. 2002, 22 pages.

B. O'Hara, et al., "Configuration and Provisioning for Wireless Access Points (CAPWAP)", Network Working Group RFC 3990, Feb. 2005, 5 pages.

3rd Generation Partnership Project, 3GPP TS 23.234 V7.1.0, "3rd Generation Partnership Project; Technical Specification Group Services and System Aspects; 3GPP System to Wireless Local Area Network (WLAN) Interworking, System Description (Release 7)," Mar. 2006, 81 pages.

Morand, Lionel, et al., "Home Gateway and Nomad Authentication," Home Gateway Initiative, France Telecom, May 2007, 12 pages.

* cited by examiner

ROAMING WI-FI ACCESS IN FIXED NETWORK ARCHITECTURES

CROSS-REFERENCE TO RELATED APPLICATIONS

The present application claims priority to U.S. Provisional Patent Application Ser. No. 60/957,740 filed Aug. 24, 2007 by John Kaippallimalil and entitled "Roaming Wi-Fi Access in Fixed Network Architectures," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In fixed communication networks, such as Internet Protocol (IP) networks, roaming or wireless access may be provided for mobile users via wireless technologies, such as Wi-Fi. Many mechanisms for providing roaming access to an IP network for a mobile user equipment (UE) are being explored. Some mechanisms may establish wireless communications between the UE and a local or home network via a home gateway (HG), which may be a residential subscriber. As such, the UE initially establishes "trust" with the HG, and hence the HG communicates with the IP network and forward communications between the UE and the IP network. However, when the UE trusts the HG, the UE communications with the IP network may be intercepted at the HG or at the home network.

Further, the HG may be in charge of controlling the communications, such as setting policies and quality of service (QoS), and accounting for the communications, such as charging for connection or time usage. However in some cases, for instance when the HG is not owned by the IP network service provider, charging the HG with controlling and accounting for communications may not be desired or beneficial to the IP network service provider.

SUMMARY

In one embodiment, the disclosure includes an apparatus comprising a node comprising an access controller (AC) and an authentication, authorization and accounting (AAA) proxy (AAA-P), wherein the AC is configured to manage authentication for a UE, and wherein the AAA-P is configured to exchange authentication information related to the UE with an AAA server.

In another embodiment, the disclosure includes a network component comprising at least one processor configured to implement a method comprising establishing a first tunnel with an HG, wherein the HG communicates wirelessly with a UE, and establishing a second tunnel between the UE and a Network Access Server (NAS).

In yet another embodiment, the disclosure includes a network component comprising at least one processor configured to implement a method comprising receiving a Pairwise Master Key (PMK) from an AAA mediator (AAA-M), and authenticating a UE using the PMK.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for providing a UE roaming access to a fixed network, such as an IP network. To provide roaming access, the UE may communicate using a wireless link with a HG, which may be located at a home network. The HG may be coupled to an access provider network comprising an IP Edge, which may be in communications with the IP network. Hence, the HG may forward communications between the UE and the IP network via the IP Edge. Specifically, the HG may communicate with the UE using the wireless link and a first shared key with the UE, and may communicate with the IP Edge using a first tunnel. Further, the UE may communicate with the IP Edge via the HG without trusting the HG using a second secure tunnel and a second shared key. Hence, the UE may establish roaming access to the IP network using the second secure tunnel without trusting the HG with its communications. Such a configuration may also allow the IP Edge to control and account for the communications of the second secure tunnel.

Figure 1:
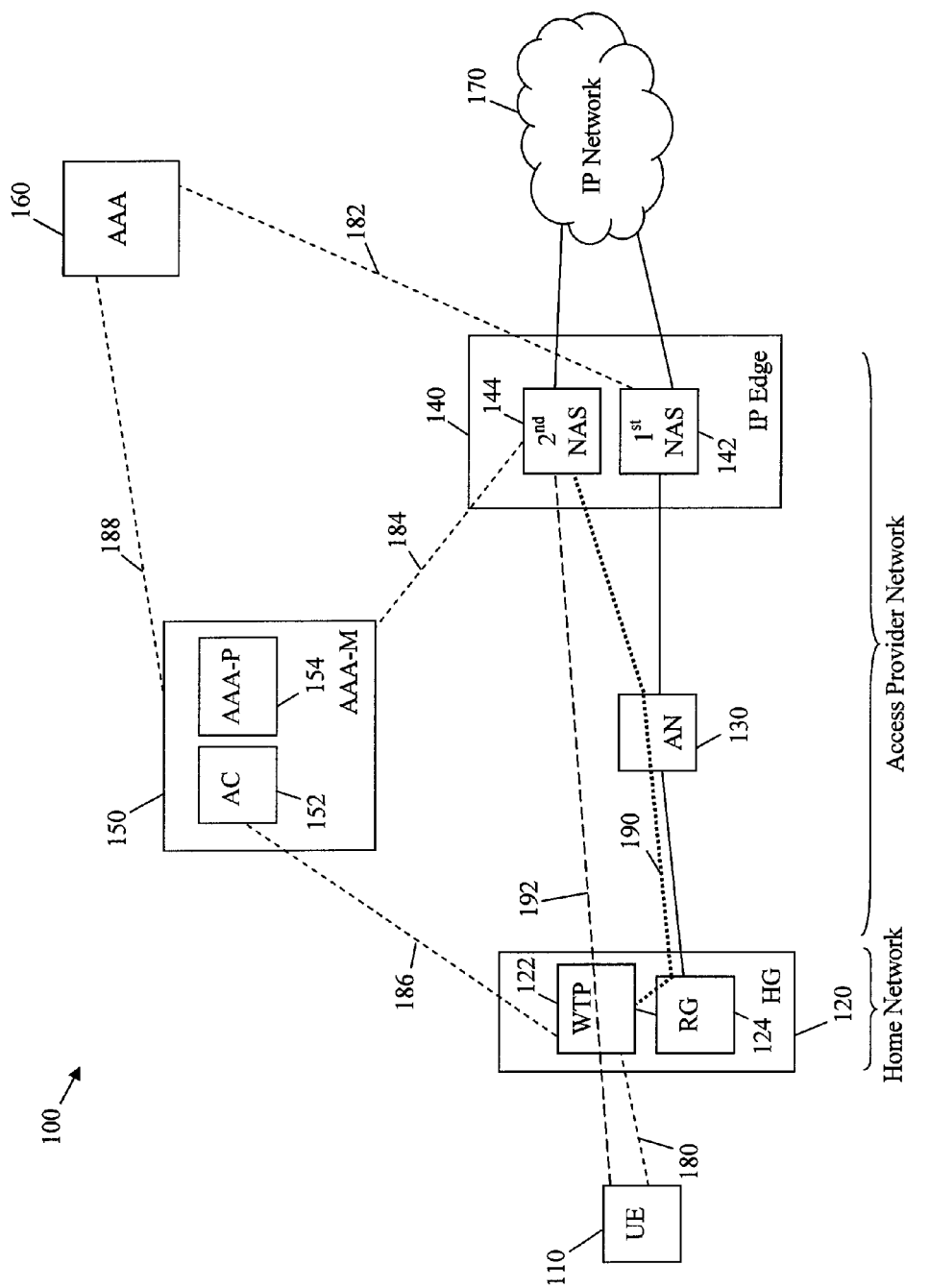
FIG. 1 is a schematic diagram of an embodiment of a fixed network roaming access system.

FIG. 1 illustrates one embodiment of a fixed network roaming access system 100. The fixed network roaming access system 100 may comprise at least one UE 110, a HG 120, an access node (AN) 130, an IP Edge 140, an AAA-M 150, an AAA server 160, and an IP network 170. In an embodiment, the HG 120 may be a home network or part of a home network, which may coupled to an access provider network comprising the AN 130 and the IP Edge 140. In turn, the access provider network may be coupled to the IP network 170 via the IP Edge 140. In some embodiments, the access provider network may also comprise the AAA-M 150.

In an embodiment, the UE 110 may be any user mobile device, component, or apparatus that communicates with the HG 120 using a wireless link 180. For example, the UE 110 may be a cellular phone, a personal digital assistant (PDA), a portable computer, or any other wireless device. The UE 110 may comprise an infrared port, a Bluetooth interface, an IEEE 802.11 compliant wireless interface, or any other wireless communication system that enables the UE 110 to communicate wirelessly with the HG 120. In an embodiment, the wireless link 180 may be an IEEE 802.11 link or a Wi-Fi link. In other embodiments, the wireless link 180 may be a Bluetooth link, a Worldwide Interoperability for Microwave Access (WiMAX) link, a near field communication (NFC) link, an Infrared Data Association (IrDa) link, or any other communication link established using wireless technology.

In an embodiment, the HG 120 may be any device, component, or network configured to allow the UE 110 to gain wireless access to the home network or to the access provider network, which may be coupled to the IP network 170. Specifically, the HG 120 may comprise a wireless termination point (WTP) 122 coupled to a router or residential gateway (RG) 124. The WTP 122 may be any device, component, or network configured to establish a wireless link with the UE 110 and forward communications between the UE 110 and another component, such as the RG 124. In an embodiment, the WTP 122 may be a fixed device that communicates with the UE 110 via the wireless link 180 and with the RG 124 via a fixed link, such as an Ethernet link. The WTP 122 may also be configured to forward authentication information between the UE 110 and the AAA-M 150. The authentication information may be required for managing the UE 110 access to the home network at the HG 120.

The RG 124 may be any device, component, or network that allows the UE 110 to communicate with the IP Edge 140 at the access provider network. For example, the RG 124 may be an IP router, such as a customer premises equipment (CPE) router or any router equipment located at a subscriber's premises and that communicates with a network. For instance, the RG 124 may be a DSL modem, a cable modem, or a set-top box. In another embodiment, the RG 124 may be a node that forwards IPv4 and/or IPv6 packets to and from the UE 110.

The RG 124 may exchange communications with the UE 110 via the fixed link between the WTP 122 and the RG 124 and the wireless link 180 between the WTP 122 and the UE 110. Additionally, the RG 124 may exchange communications with the IP Edge 140 using a tunnel 190, which may be established between the HG 120 and the IP Edge 140 via the AN 130. For instance, the tunnel 190 may be a Wi-Fi roaming virtual local access network (VLAN) that may be established between the WTP 122, the RG 124, the AN 130, and the IP Edge 140. The tunnel 190 may be used to forward network setup information, such as IP address request and allocation, between the UE 110 to the IP Edge 140.

In an embodiment, the AN 130 may be any device that transports communications between the HG 120 and the IP Edge 140. For example, the AN 130 may be a switch, a router, or a bridge, such as a Provider Edge Bridge (PEB) or a Provider Core Bridge (PCB). The AN 130 may be located at the access provider network and may be coupled to the HG 120 and the IP Edge 140 via fixed links, such as Ethernet links. Additionally, the AN 130 may communicate with the HG 120 and the IP Edge 140 using the tunnel 190.

In an embodiment, the IP Edge 140 may be any device that forwards communications between the HG 120 and the IP network 170. For example, the IP Edge 140 may be a Broadband Routed Access Server (BRAS) as defined by the Broadband Forum or a Cable Modem Termination Server (CMTS). The IP Edge 140 may comprise a first network access server (NAS) 142 and a second NAS 144. The first NAS 142 and the second NAS 144 may comprise bridges, switches, routers, or combinations thereof. In some embodiments, the first NAS 142 and the second NAS 144 may be combined into one component such as a bridge or a router. For example, the first NAS 142, the second NAS 144, or both may be a Back Bone Edge Bridge (BEB), a PEB, a PCB, or a user network interfaces (UNI). Alternatively, the first NAS 142, the second NAS 144, or both may be a point-oriented wire-line node, such as a Digital Subscriber Line (DSL) connection or a provider network edge device.

The first NAS 142 may be coupled to the RG 124, via the AN 130, and to the IP network 170 via fixed links. The first NAS 142 may forward communications between the IP network 170 and the home network or the access provider network using the fixed links. Additionally, the first NAS 142 may exchange authentication information related to a home network component or an access provider network component with the AAA server 160. The authentication information may be exchanged using a session flow 182, which may be established using Remote Authentication Dial In User Service (RADIUS) protocol. The DIAMETER protocol may be used in place of any RADIUS protocol implementation described herein.

The second NAS 144 may also be coupled to the IP network 170 via a fixed link, and may exchange authentication information with the AAA-M 150 using a session flow 184. Similar to the session flow 182, the session flow 184 may also be established using RADIUS or DIAMETER. Additionally, the second NAS 144 may communicate with the UE 110 using a secure tunnel 192 without trusting the HG 120, which may be established after authenticating the UE 110 and allocating an IP address for the UE 110. For instance, the secure tunnel 192 may be an Internet Protocol Security (IPsec) that uses Internet Key Exchange (IKE) to establish a secure session flow between the UE 110 and the second NAS 144.

In some embodiments, the fixed network roaming access system 100 may comprise a plurality of UEs 110 that communicate with the second NAS 144 using a plurality of secure tunnels 192 corresponding to each UE 110. In other embodiments, the IP Edge 140 may comprise a plurality of second NASs 144 that communicate one on one with a plurality of UEs 110 using a plurality of secure tunnels 192.

In an embodiment, the AAA-M 150 may be any device, component, or server that manages the UE 110 access to the home network and the access provider network at the HG 120, and to the IP network 170 at the IP Edge 140. The AAA-M 150 may comprise an AC 152 and an AAA-P 154. The AC 152 may be configured to manage authentication of the UE 110. For instance, the AC 152 may exchange authentication information with the UE 110, via the WTP 122, using a Control and Provisioning of Wireless Access Points (CAPWAP) protocol. Specifically, the authentication information may be exchanged between the UE 110 and the WTP 122 via the wireless link 180 and between the WTP 122 and the AC 152 via a session flow 186 using CAPWAP.

In other embodiments, the AC 152 may be configured to exchange the authentication information using any other suitable management protocol. For example, the AC 152 may be coupled to the WTP 122 via a DSL link and may manage the forwarded authentication information using a Broadband Forum technical report 069 (TR-069) protocol. Alternatively, the AC 152 may be coupled to the WTP 122 via an optical link and may manage the UE 110 access using an optical network terminal management and control interface (OMCI) protocol or an OMCI layer-two connection protocol (OMCI/L2CP).

The AAA-P 154 may be an AAA agent configured to forward or relay some of the authentication information for the UE 110 to the AAA server 160. For instance, the AAA-M 150 may establish with the AAA server 160 a session flow 188 to exchange the authentication information, using the RADIUS or DIAMETER. Additionally, the AAA-P 154 may be configured to forward authentication information between the second NAS 144 and the AAA-M 150 using the session flow 184. In some embodiments, the AAA-P 154 may be configured to manage the flow of the authentication information. For instance, the AAA-P 154 may be in charge of multiplexing and forwarding a plurality of messages between a plurality of second NASs 144 and the AAA server 160. In some embodiments, the AAA-P 154 may also be configured to enforce some policies relating to resource usage and provisioning.

In an embodiment, the AAA server 160 may be any device, component, or server configured to implement an AAA protocol, which defines various mechanisms and policies for authentication, authorization, and accounting. Some authentication information, related to managing the UE's 110 access to the IP network 170, may be forwarded between the AAA server 160 and the second NAS 144 via the AAA-M 150 using the RADIUS or DIAMETER (session flows 188 and 184). Additionally, other authentication information, related to managing the UE's 110 access to the home network or the access provider network, may be forwarded between the AAA server 160 and the HG 120 via the AAA-M 150 using RADIUS (session flow 188) and CAPWAP (session flow 186).

In terms of authentication, the AAA server 160 may verify a claimed identity for the UE 110. For instance, the AAA server 160 may establish authentication by matching a digital identity, such as a network address, to a client information database. In other embodiments, the AAA server 160 may match credentials corresponding to the UE 110, such as passwords, one-time tokens, digital certificates, or phone numbers to the client information database.

In terms of authorization, the AAA server 160 may determine if a particular right, such as access to some resource, can be granted to the UE 110. For instance, the AAA server 160 may grant specific types of privileges (including "no privilege") to the UE 110 based on the UE's 110 authentication, the privileges requested by the UE 110, the current system state, or combinations thereof. Authorization may be based on restrictions, for example time-of-day restrictions, physical location restrictions, or restrictions against multiple logins by the UE 110. Granting a privilege may comprise provisioning usage of a certain type of service, such as IP address filtering, address assignment, route assignment, QoS services, bandwidth control, traffic management, tunneling to a specific endpoint, and encryption.

In terms of accounting, the AAA server 160 may track usage or allocation of network resources to the UE 110. The usage information may be used for management, planning, billing, or other purposes. In some embodiments, the AAA server 160 may track real-time accounting information, which may be forwarded by the IP Edge 140 concurrently with the usage or consumption of resources. In other embodiments, such accounting information may be batched, saved, and delivered at a later time to the AAA server 160 by the IP Edge 140. Accounting information may comprise the identity of the UE 110, the nature of the service delivered, the service starting time, and the service ending time.

In an embodiment, the IP network 170 may be any type of network that exchanges IP data packets with the IP Edge 140, the HG 120, and the UE 110. For example, the IP network 170 may be a Packet Switched Network (PSN), an intranet, an Internet, or a local area network (LAN). The IP network 170 may be an Ethernet transport network, a backbone network, an access network, an optical network, a wire-line network, an Institute of Electrical and Electronics Engineers (IEEE) 802 standard network, a wireless network, or any other IP based network.

Figure 2:
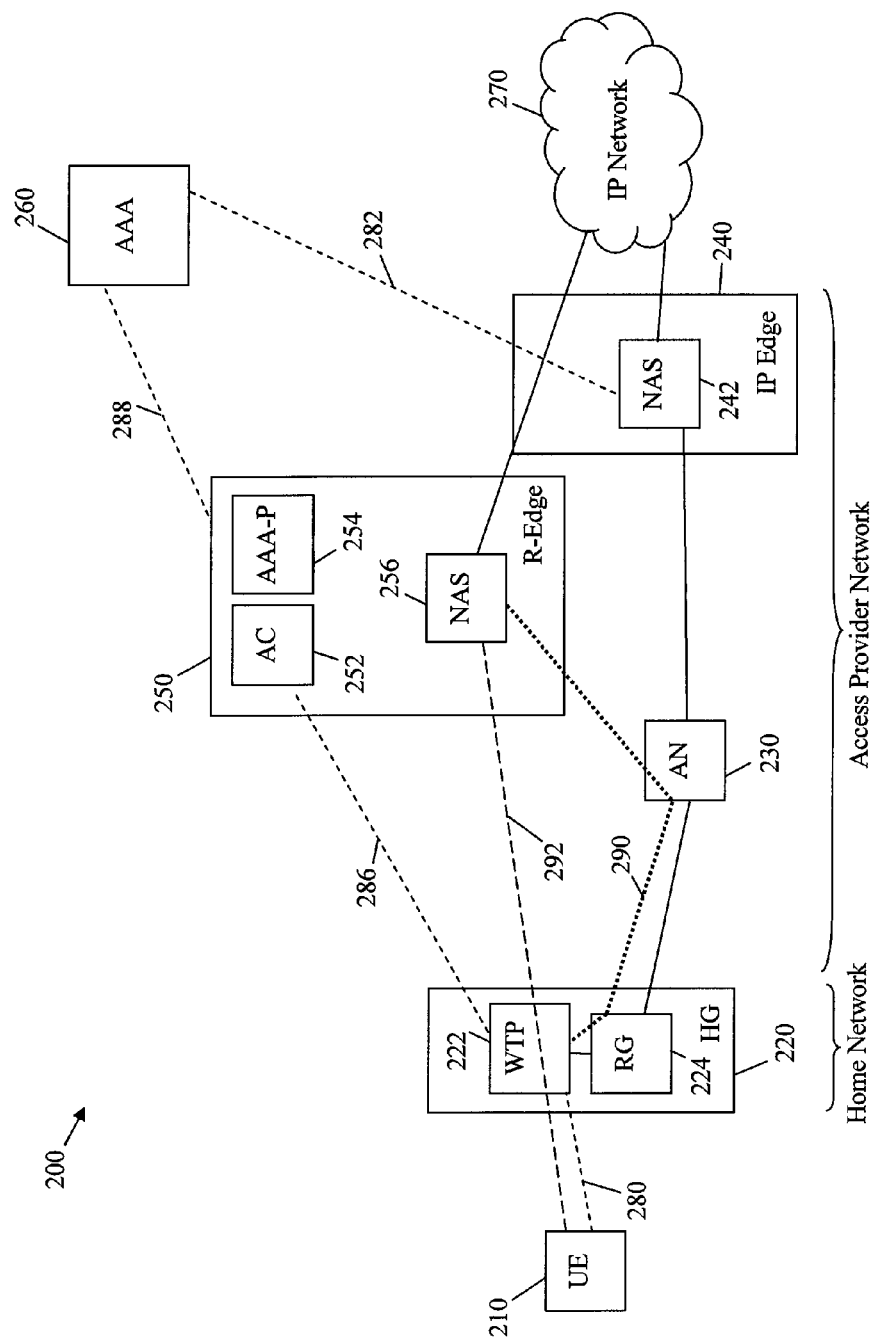
FIG. 2 is a schematic diagram of another embodiment of a fixed network roaming access system.

FIG. 2 illustrates an embodiment of another fixed network roaming access system 200. The fixed network roaming access system 200 may comprise at least one UE 210, a HG 220, an AN 230, an IP Edge 240, an router edge (R-Edge) 250, an AAA server 260, and an IP network 270. In an embodiment, the HG 220 may be a home network or part of a home network, which may coupled to an access provider network comprising the AN 230 and the IP Edge 240. Additionally, the IP Edge 240 at the access provider network may be coupled to the IP network 270. The UE 210, the HG 220, the AN 230, the AAA server 260, and the IP network 270 may be configured similar to the corresponding components of the fixed network roaming access system 100. Additionally, in FIG. 2, the session flows 280, 282, 286, and 288 between the various components may be configured similar to the corresponding session flows of the fixed network roaming access system 100.

Further, the IP Edge 240 may comprise a single NAS 242, which may be configured similar to the first NAS 142. As such, the IP Edge 240 may be configured similar to an IP Edge in standard or access provider networks. The R-Edge 250 may comprise an AC 252 configured similar to the AC 152, an AAA-P 254 configured similar to the AAA-P 154, and a NAS 256 configured similar to the second NAS 144. As such, the NAS 256 may be located along with the AC 252 and the AAA-P 254, at another provider network instead than the IP Edge 240. For instance, the NAS 242 may be located at a second provider network in communications with the access provider network comprising the IP Edge 240.

The NAS 256 may exchange communications with the HG 220 using a tunnel 290, which may be established between the HG 220 and the R-Edge 250 via the AN 230. The tunnel 290 may be used to forward the network setup information, such as IP address assignment information, between the UE 210 to the IP Edge 140. In an embodiment, the tunnel 290 may be a Wi-Fi roaming virtual local access network (VLAN) that may be established between the WTP 222, the RG 224, the AN 230, and the NAS 256. Additionally, the NAS 256 may exchange communications with the UE 210 using a secure tunnel 292, without trusting the HG 220. In an embodiment, the secure tunnel 292 may be an IPsec that uses IKE to establish secure communications between the UE 210 and the IP network 270, via the R-Edge 250.

To establish roaming access to a mobile UE in a fixed or IP network, such as in the fixed network roaming access systems 100 or 200, some of the authentication information related to the UE may be forwarded from the HG to the AAA-M using the CAPWAP protocol. The CAPWAP protocol may be an interoperable protocol between the AAA-M and the HG, which is independent of a specific wireless technology. Elements of the CAPWAP protocol may be designed to accommodate the specific needs of a wireless technology in a standard way. The CAPWAP protocol may be implemented for a particular wireless technology following the binding requirements defined for that technology. The binding may comprise definitions for technology-specific messages and for technology-specific message elements. The CAPWAP may support a local network comprising a plurality of HGs communicating with the AC at the AAA-M via IP based connections. For instance, the CAPWAP protocol may support an IEEE 802.11 Wireless LAN (WLAN) based network comprising the UE and the HG, via IEEE 802.11 binding. As such, the CAPWAP protocol may enable the AC to manage the UE's access to the network at the HG. The HG may operate as an AC controlled interface, such as a remote Radio Frequency (RF) interface, for connecting the UE to the IP network, which may require a set of dynamic management and control functions. The CAPWAP protocol is typically used in private enterprises, but may be implemented in the public domain as described herein.

In an embodiment, the CAPWAP protocol may support a split Media Access Control (MAC) operation mode where all layer-two (L2) wireless data and management frames are encapsulated via the CAPWAP protocol and exchanged between the AC and the HG. In this mode, the wireless frames received from the UE may be directly encapsulated by the HG and forwarded to the AC. Alternatively, the CAPWAP protocol may support a local MAC mode of operation where the L2 wireless management frames may be processed locally by the HG, and then forwarded to the AC. Hence, the CAPWAP protocol may centralize the authentication and policy enforcement functions for a wireless network. The CAPWAP protocol may enable shifting higher-level protocol processing from the HG to the AC, which leaves time for critical applications of wireless control and access for the HG. Additionally, the CAPWAP protocol may provide a generic encapsulation and transport mechanism, which enables applying the CAPWAP protocol to various access point types of technologies, via specific wireless binding.

According to the CAPWAP protocol, two types of data or payload may be transported comprising the CAPWAP data messages and the CAPWAP control messages. The CAPWAP data messages may encapsulate forwarded wireless frames. The CAPWAP control messages may be management messages exchanged between the HG and the AC. The CAPWAP data and control messages may be fragmented into packets, which may be sent using separate ports. The transported CAPWAP control messages, the CAPWAP data messages, or both may be encrypted or secured, for instance using IPsec or Datagram Transport Layer Security (DTLS). The IPsec may comprise a suite of protocols for securing IP communications by authenticating each IP packet in a data stream, encrypting each IP packet in a data stream, or both. The IPsec may also include protocols for cryptographic key establishment. For instance, the IPsec may use an IKE protocol to handle negotiation of protocols and algorithms based on local policy and to generate encryption and authentication keys, and hence set up a secure IPsec communication session.

Additionally, the CAPWAP protocol may enable transporting Extensible Authentication Protocol (EAP) payloads to establish the secure IPsec communication session. The EAP may be a universal authentication framework used in wireless networks, such as WLANs, and Point-to-Point connections. The EAP may provide some common functions and negotiation for a desired authentication mechanism, also referred to as an EAP method, which may be defined by the IKE protocol. For instance, when the EAP is invoked, the EAP method may provide a secure authentication mechanism and negotiate a secure PMK between the AC on one end and the HG and the UE on the other end. The PMK may then be used for setting up the secure IPsec communication session.

The CAPWAP protocol may begin with a discovery phase, where the HG sends, via the WTP, a Discovery Request message. The AC may receive the Discovery Request message and respond with a Discovery Response message. The HG may receive the Discovery Response messages and in response establishes the secure IPsec (or DTLS) communication session with the AC. Once the HG and the AC establish the secure IPsec communication session, a configuration exchange may occur in which both components agree on information. During this exchange, the HG may receive provisioning settings and may hence be enabled for operation.

Additionally, some of the authentication information related to the UE may be exchanged between the AAA-M, the AAAs server, and the IP Edge using the RADIUS protocol The RADIUS may be used to transport authentication information related to the UE, such as a username and a password. Accordingly, the IP Edge may create an "Access-Request" comprising attributes as the UE's user name, the UE's user password, the identity (ID) of the IP Edge, the Port ID which the UE is accessing, or combination thereof The Access-Request may then be forwarded to the AAA server that acts as a RADIUS server, for example via the AAA-M. The request may be sent a number of times when no response is returned within a length of time.

The RADIUS server may receive the request and may use a client information database to find the UE identified in the request. The UE entry in the database may comprise a list of requirements, which must be met to allow access for the UE to the IP network via the IP Edge. The requirements may comprise verification of the password, the IP Edge or port to which the UE is allowed access, or other requirements. If a requirement or condition is not met, the RADIUS server may send an Access-Reject response indicating that the request is invalid. If the requirements or conditions are met, the list of configuration values for the UE may be placed into an Access-Accept response. These values may comprise a type of service, such as a serial line Internet protocol (SLIP), a point-to-point protocol (PPP), or a Login User, in addition to other required values for delivering the service. For SLIP and PPP, this may include values such as IP address/subnet mask, Ethernet MAC ID, maximum transmission unit (MTU), desired compression, desired packet filter identifiers, desired protocol, and desired host.

Figure 3:
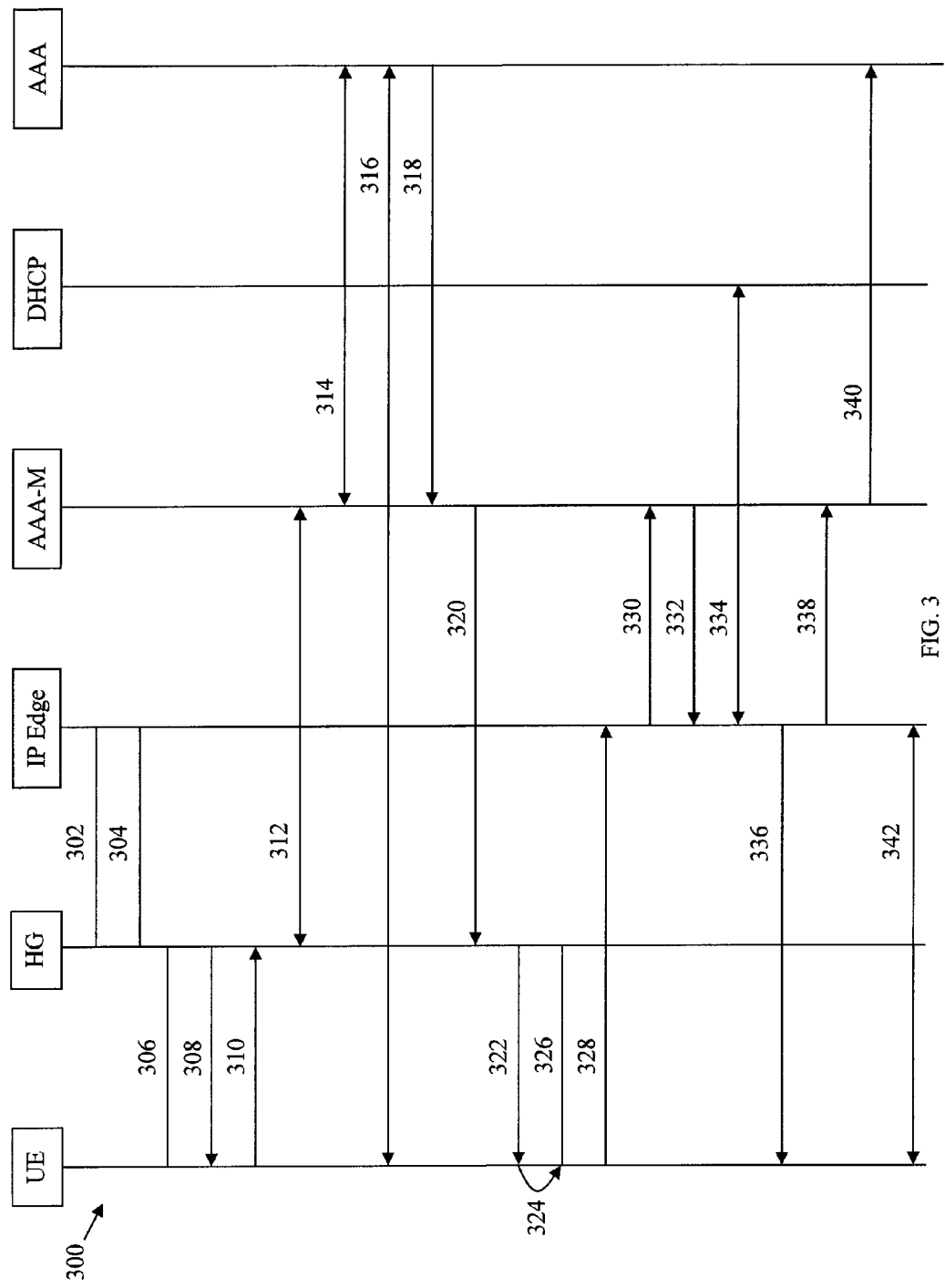
FIG. 3 is a protocol diagram of an embodiment of roaming access method.

FIG. 3 illustrates an embodiment of a roaming access method 300 that provides a mobile UE wireless access to an IP network via an HG at a home network and an IP Edge (or an R-Edge) at an access provider network. Specifically, the method 300 may provide the UE roaming access to the IP network by establishing a wireless link with the HG and without trusting the HG with its communications with the IP network.

In the method 300, the HG may initially exchange authentication data with the IP Edge (or the R-Edge), and hence establish an IP session 302 with the IP Edge. As such, the HG may establish a tunnel 304 with the IP Edge, such as a Wi-Fi roaming VLAN. In an embodiment, the tunnel 304 may comprise, in addition to the HG and the IP Edge, an AN in communication with the HG and the IP Edge.

When the mobile UE roams within the vicinity of the HG, the UE and the HG may establish a wireless association or link 306, which may be an 802.11 association. Specifically, the UE may establish the wireless association 306 with a WTP at the HG. In an embodiment, after establishing the wireless association 306, the UE may not be authorized to communicate with the HG. For instance, the ports at the HG may be blocked to the UE. The HG may request from the UE authentication information, using the wireless association 306. For instance, the HG may forward EAP Request 308 to the UE using the wireless association 306. In turn, the UE may respond to the HG with the requested authentication information. For instance, the UE may forward an EAP Response 310 to the HG using the wireless association 306.

When the HG receives the EAP Response 310 comprising the authentication information, the HG may forward the authentication information to an AAA-M. For instance, HG may exchange EAP parameters 312 with the AAA-M using the CAPWAP. The EAP parameters 312 may comprise the UE's authentication information. In turn, the AAA-M may forward the authentication information to an AAA server. For instance, the AAA-M may use RADIUS to exchange with the AAA server EAP parameters 314, which may comprise the authentication information.

The AAA server may receive the EAP parameters 314, and authenticate the UE using an EAP sequence 316. As a result of an authentication phase of the EAP sequence 316, a Master Session Key (MSK) may be derived, for instance using a secret key based authentication derivation. For instance, a secret key may be initially provisioned, for example during subscriber initialization, in the AAA server and the UE. Hence, during the authentication phase, the UE may prove to the AAA server its knowledge or possession of the secret key by responding with the authentication information (EAP Response 310). The authentication information may comprise additional key material that both the AAA server and the UE utilize to derive the MSK, for instance using specific algorithms. Upon successful authentication, the AAA server may forward to the AAA-M a successful authentication reply 318 using RADIUS, which may comprise authorization information or parameters and the MSK. The AAA-M may use the MSK to derive a first Pairwise Master Key (PMK1) and a second Pairwise Master Key (PMK2).

The AAA-M may then forward a successful authentication reply 320 to the HG using CAPWAP. The successful authentication reply 320 may comprise the authorization parameters from the AAA server in addition to the PMK1. In turn, the HG may forward a successful authentication reply 322 to the UE using the wireless association 306. When the UE derives the MSK after successful completion of the EAP sequence 316, the UE may use the MSK, for instance by executing an algorithm 324, to derive the same PMK1 and PMK2 at the AAA-M. Thus, the UE may share PMK1 with the HG. The UE and the HG may then use the shared PMK1 and an IEEE 802.11i protocol to implement a four-way (4-way) handshake or exchange to establish a secure wireless link channel 326, for instance a secure 802.11 channel, with the HG. In an embodiment, the UE and the HG may each use the PMK1 to derive a first Pairwise Transient Key (PTK1), which may be used to establish the secure wireless link channel using the 802.11i 4-way exchange.

Next, the UE may forward an IP address request 328, such as a Dynamic Host Configuration Protocol (DHCP) request, to the IP Edge to obtain an IP address for accessing the IP network. The IP address request 328 may be forwarded to the IP Edge via the HG and the tunnel 304 (Wi-Fi roaming VLAN tunnel). The IP Edge may then forward an authorization request 330 to the AAA-M using RADIUS to obtain authorization for the UE. In an embodiment, the IP Edge may forward directly any authorization request received via the tunnel 304 to the AAA-M, without processing the authorization request. The authorization request 330 may comprise UE connection identification information such as the UE's Media Access Control (MAC) address, a Line ID, a VLAN ID, or combinations thereof.

The AAA-M may use the connection identification information to verify the identity of the UE, and may authorize the UE's connection. In an embodiment, the AAA-M may communicate with the AAA server to identify the UE. Hence, the AAA-M may forward an authorization reply 332 using RADIUS to the IP Edge. The authorization reply 332 may comprise connection authorization information related to the UE in addition to the PMK2. Thus, the IP Edge may share the PMK2 with the UE. The IP Edge may then exchange a DHCP request and response 334 with the DHCP server and obtain an IP address allocated to the UE. Additionally, the IP Edge may bind the received authorization from to the AAA-M to the allocated IP address. Next, the IP edge may forward a DHCP response 336 comprising the allocated IP address to the UE.

The IP Edge may then forward an Accounting Start message 338 to the AAA-M using RADIUS. The Accounting Start message 338 may be used to signal the AAA-M that a communication session may be about to start between the UE and the IP network. Additionally, the IP Edge may forward the allocated IP address to the AAA-M with the Accounting Start message 338. In turn the AAA-M may forward an Accounting Start message 340 to the AAA server, which may include the allocate IP. As such, the AAA server may begin accounting for the UE's roaming access connection usage. In an embodiment, the IP Edge may receive from the AAA server via the AAA-M, or from the AAA-M, accounting policy information related to the UE using RADIUS. For instance, the IP Edge may receive the accounting policy information in addition to the connection authorization information in the authorization reply 332. As such, the IP Edge may police the UE's roaming access connection usage, while accounting for the connection usage may be handled separately by the AAA server. The IP Edge may use the allocated IP address, which may be bounded to the accounting policy information, to identify and police the UE connection usage. Similarly, the AAA server may use the allocated IP address to identify and account for the UE connection usage.

When the UE receives the DHCP response 336 comprising the allocated IP, the UE and the IP Edge may establish a secure IP tunnel 342, such as an IPsec using IKE. In an embodiment, the UE and the IP Edge may each use the shared PMK2 to derive a second Pairwise Transient Key (PTK2), which may be used to establish the secure IP tunnel 342 without trusting the HG.

When the roaming UE leaves the vicinity of the HG, the secure wireless link channel 326 between the UE and the HG is disconnected. Accordingly, accounting and policing the UE's roaming access connection usage may be terminated. The IP Edge may be informed, for example by the HG, with the secure wireless link channel 326 disconnection, and may then remove or discard the UE's authorization and policy information, including the PMK2 and the PTK2. Additionally, the AAA server may be informed, for example by the IP Edge or the AAA-M, with the secure wireless link channel 326 disconnection, and may stop accounting for the connection usage. In an embodiment, stopping the accounting for the connection usage at the AAA server may trigger a CAPWAP sequence to the HG, for example by the AAA-M, that results in removing the PMK1 and the PTK1 in addition to other authentication information related to the UE.

Figure 4:
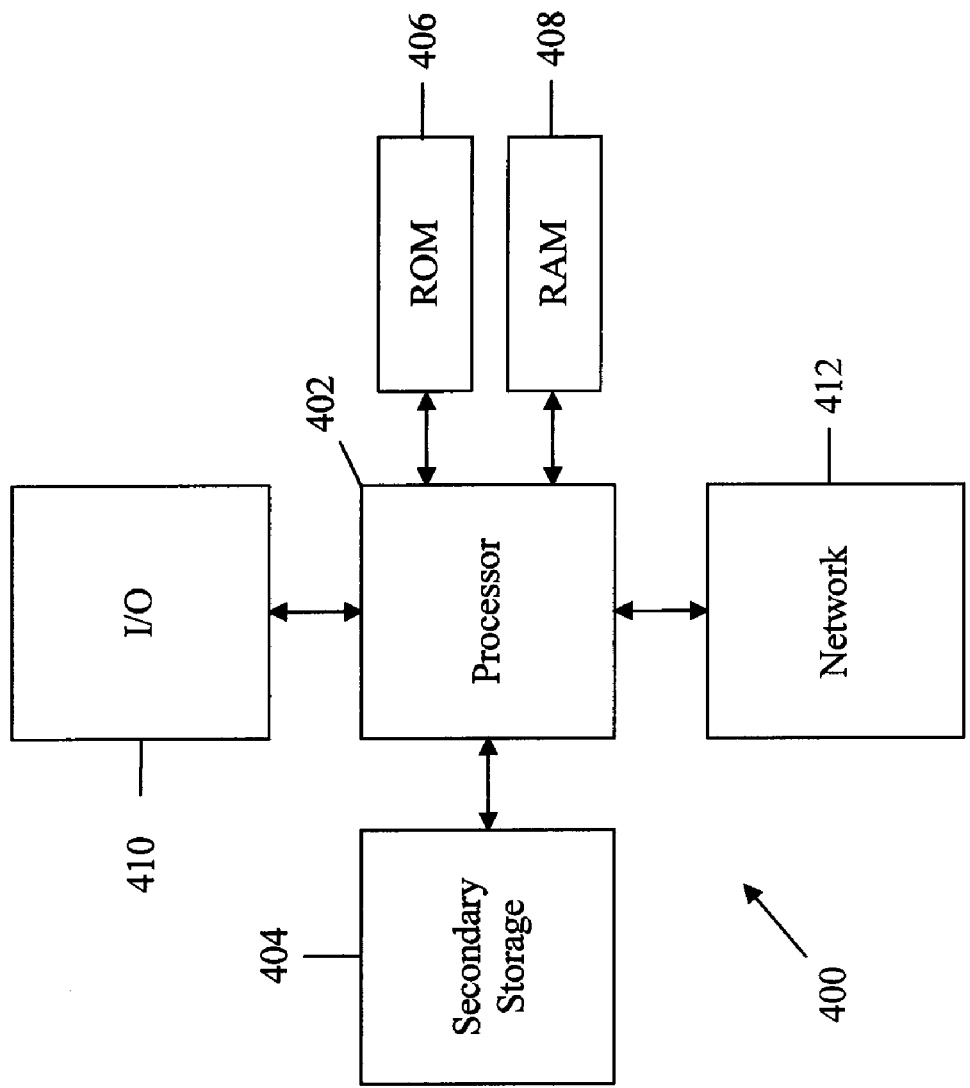
FIG. 4 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 4 illustrates a typical, general-purpose network component 400 suitable for implementing one or more embodiments of the components disclosed herein. The network component 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage 404. The RAM 408 is used to store volatile data and perhaps to store instructions. Access to both ROM 406 and RAM 408 is typically faster than to secondary storage 404.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   deriving, by an authentication, authorization, and accounting (AAA) proxy (AAA-P), a first Pairwise Master Key (PMK1) and a second Pairwise Master Key (PMK2) from a Master Session Key (MSK);
   sending, by the AAA-P, the PMK1 to a home gateway (HG) and a network access server (NAS), wherein the PMK1 is used to establish a first tunnel between the HG and the NAS, and wherein the HG communicates wirelessly with a user equipment (UE);
   sending, by the AAA-P, the PMK2 to the NAS, wherein the PMK2 is used to establish a second tunnel between the UE and the NAS via the HG, and wherein the second tunnel comprises a secure connection between the UE and the NAS; and
   sending, by the UE, an encrypted communication to the NAS via the second tunnel,
   wherein the HG relays the encrypted communications to the NAS,
   wherein the HG does not have access to the PMK2 or any encryption keys derived therefrom such that the HG cannot decrypt the encrypted communications, and
   wherein the PMK2 is not distributed or otherwise made available to the HG such that the HG cannot decrypt the encrypted communications when relaying the encrypted communications from the UE to the NAS.

2. The method of claim 1, wherein the first tunnel is a wireless virtual local area network (VLAN), and wherein the second tunnel is an Internet Protocol Security (IPsec) tunnel.

3. The method of claim 1, wherein the second tunnel provides the UE with access to an Internet Protocol (IP) network associated with the NAS, and wherein the method further comprises controlling, by the AAA-P, a session between the UE and the IP network.

4. The method of claim 3 further comprising: accounting, by the AAA-P, for the session between the UE and the IP network.

5. The method of claim 1, wherein prior to deriving the PMK1 and the PMK2 from the MSK, the method further comprises receiving, by the AAA-P, the MSK from an AAA server.

6. The method of claim 5, wherein the MSK is received as part of a Remote Authentication Dial In User Service (RADIUS) or DIAMETER session.

7. The method of claim 1, wherein the UE sends the encrypted communication to the NAS without trusting the HG with the contents of the encrypted communication.

8. A network component comprising:
   at least one processor configured to:
      establish a first tunnel with a home gateway (HG), wherein the HG communicates wirelessly with a user equipment (UE);
      obtain a Master Session Key (MSK) from an authentication, authorization and accounting (AAA) server;
      derive both a first Pairwise Master Key (PMK1) and a second Pairwise Master Key (PMK2) from the MSK;
      send the PMK1 to the HG, wherein the PMK1 is used to establish an authentication between the HG and the UE; and
      send the PMK2 to a network access server (NAS), wherein the UE and the NAS use the PMK2 to establish a secure tunnel through the HG over which encrypted communications are transported from the UE to the NAS,
      wherein the HG is configured to relay the encrypted communications from the UE to the NAS, and
      wherein the PMK2 is not distributed or otherwise made available to the HG such that the HG cannot decrypt the encrypted communications when relaying the encrypted communications from the UE to the NAS.

9. The network component of claim 8, wherein the PMK1 is sent using Control and Provisioning of Wireless Access Points (CAPWAP).

10. The method of claim 5, wherein prior to sending the PMK1 to the HG and the NAS, the method further comprises authenticating, by the AAA server, the UE using an authentication protocol that is communicated between the AAA server and the UE via the AAA-P, wherein the AAA server and the UE independently derive the MSK during authentication, and wherein the UE independently derives the PMK1 and the PMK2 from the MSK.

11. The method of claim 10, wherein the AAA-P is part of an AAA mediator (AAA-M) coupled to the AAA server, wherein the NAS is part of an Internet Protocol (IP) edge coupled to the AAA-M, and wherein neither the first tunnel nor the second tunnel pass through the AAA-M.

12. The method of claim 10, wherein the NAS and the AAA-P are part of a router edge (R-edge), wherein both the first tunnel and the second tunnel pass through the R-edge, and wherein neither the first tunnel nor the second tunnel pass through an Internet Protocol (IP) edge that is separate from the R-edge.

13. The method of claim 12, wherein the first tunnel is a wireless virtual local area network (VLAN), and wherein the second tunnel is an Internet Protocol Security (IPsec) tunnel.

14. The method of claim 1, wherein relaying the encrypted communications comprises:
- receiving, by the HG, the encrypted communications from the UE via the second tunnel, wherein the encrypted communications comprise information that has been encrypted to form encrypted content; and
- forwarding, by the HG, the encrypted communications to the NAS over the second tunnel.

15. The network component of claim 8, wherein the UE sends the encrypted communication to the NAS without trusting the HG with the contents of the encrypted communication.

16. The network component of claim 8, wherein the network component is AAA mediator (AAA-M).

17. A network comprising:
- a Home Gateway (HG) configured to communicate wirelessly with a User Equipment (UE) via a wireless link that is established using a first Pairwise Master Key (PMK1);
- a Network Access Server (NAS) coupled to the HG, wherein the NAS is an access point for an Internet Protocol (IP) network; and
- an authentication, authorization, and accounting (AAA) proxy (AAA-P) coupled to the HG and configured to send a second Pairwise Master Key (PMK2) to the NAS,
- wherein the PMK1 and the PMK2 are derived from a Master Session Key (MSK),
- wherein the PMK2 is used to establish a secure tunnel between the UE and the NAS that passes through the HG,
- wherein the UE is configured to send an encrypted communication to the NAS via the secure tunnel, and
- wherein the PMK2 is not distributed or otherwise made available to the HG such that the HG cannot decrypt the encrypted communications when relaying the encrypted communications from the UE to the NAS.

18. The network of claim 17, wherein the HG is configured to:
- receive an encrypted communication from the UE via the secure tunnel, wherein the encrypted communications comprise information that has been encrypted to form encrypted content; and
- forward the encrypted communication to the NAS via the secure tunnel, wherein the HG lacks the capability to decrypt the encrypted content or otherwise access the information encrypted therein.

19. The network of claim 17 further comprising an AAA server coupled to the AAA-P, wherein the AAA server is configured to authenticate the UE via the AAA-P prior to the AAA-P sending the PMK2 to the NAS, and wherein the AAA server and the UE independently derive a Master Session Key (MSK) during authentication.

20. The network of claim 19, wherein, prior to sending the PMK2 to the HG and the NAS, the AAA-P is further configured to:
- receive the MSK from the AAA server; and
- derive the PMK2 from the MSK.

21. The network of claim 20, wherein the AAA-P is part of an AAA mediator (AAA-M), wherein the NAS is part of an IP edge that is coupled to the AAA-M, and wherein the secure tunnel does not pass through the AAA-M.

22. The network of claim 19, wherein the NAS and the AAA-P are part of a router edge (R-edge), and wherein the secure tunnel does not pass through an IP edge router that is separate from the R-edge.

23. The method of claim 17, wherein the UE sends the encrypted communication to the NAS without trusting the HG with the contents of the encrypted communication.

\* \* \* \* \*

UNITED STATES PATENT AND TRADEMARK OFFICE
CERTIFICATE OF CORRECTION

PATENT NO. : 8,335,490 B2
APPLICATION NO. : 12/192488
DATED : December 18, 2012
INVENTOR(S) : John Kaippallimalil Page 1 of 1

It is certified that error appears in the above-identified patent and that said Letters Patent is hereby corrected as shown below:

In the Claims

Column 14:
Line 32, printed claim 23: delete "The Method" and insert --The Network--.

Signed and Sealed this
Third Day of September, 2013

Teresa Stanek Rea
*Acting Director of the United States Patent and Trademark Office*